(12) United States Patent
Juen et al.

(10) Patent No.: US 8,034,446 B2
(45) Date of Patent: Oct. 11, 2011

(54) COMPOSITE SOLID SURFACE ARTICLE WITH A BACKING AND METHOD OF FORMING THE SAME

(75) Inventors: Jae Wook Juen, Seoul (KR); Eung Seo Park, Yeous-si (KR); Do Choon Rha, Seoul (KR)

(73) Assignee: Cheil Industries, Inc., Gumi-si, Gyeongsangbuk-do (KR)

( * ) Notice: Subject to any disclaimer, the term of this patent is extended or adjusted under 35 U.S.C. 154(b) by 774 days.

(21) Appl. No.: 11/812,138

(22) Filed: Jun. 15, 2007

(65) Prior Publication Data
US 2007/0240818 A1   Oct. 18, 2007

Related U.S. Application Data

(63) Continuation of application No. PCT/KR2005/004321, filed on Dec. 15, 2005.

(30) Foreign Application Priority Data

Dec. 17, 2004 (KR) .................. 10-2004-0107879

(51) Int. Cl.
*B32B 5/00* (2006.01)
*B32B 27/08* (2006.01)
*B32B 27/20* (2006.01)
*B32B 27/30* (2006.01)
*B32B 27/36* (2006.01)

(52) U.S. Cl. ............... 428/317.9; 428/304.4; 428/318.4; 428/323; 428/326; 428/480; 428/482; 428/483; 428/522; 428/537.1; 428/319.7; 427/243; 427/244; 427/331; 427/372.2; 427/373; 427/384; 427/385.5; 427/393.5

(58) Field of Classification Search .................. None
See application file for complete search history.

(56) References Cited

U.S. PATENT DOCUMENTS

| | | | | |
|---|---|---|---|---|
| 4,141,944 | A | * | 2/1979 | Anstadt et al. ............... 264/45.5 |
| 4,225,383 | A | * | 9/1980 | McReynolds ................. 162/156 |
| 4,844,944 | A | * | 7/1989 | Graefe et al. ................. 428/35.7 |
| 4,844,955 | A | * | 7/1989 | Graefe et al. .................. 428/420 |
| 5,422,170 | A | * | 6/1995 | Iwata et al. ................... 428/218 |
| 5,580,621 | A | * | 12/1996 | Kuszaj et al. ................. 428/34.1 |
| 5,662,846 | A | * | 9/1997 | Swarts ............................ 264/69 |
| 5,662,847 | A | * | 9/1997 | Uchida et al. ................. 264/101 |
| 5,679,298 | A | * | 10/1997 | Uchida et al. ................. 264/101 |
| 5,683,638 | A | * | 11/1997 | Crigler et al. ................... 264/71 |
| 5,789,032 | A | * | 8/1998 | Le Cong et al. .............. 427/346 |
| 5,792,524 | A | | 8/1998 | Lingart et al. |
| 5,869,173 | A | * | 2/1999 | Zheng et al. ................ 428/313.3 |
| 5,976,670 | A | * | 11/1999 | Fugazzi ........................ 428/161 |
| 5,993,920 | A | | 11/1999 | Kim |
| 6,003,169 | A | * | 12/1999 | Davis, Jr. ......................... 4/613 |
| 6,004,663 | A | * | 12/1999 | Swarts ........................ 428/310.5 |
| 6,210,792 | B1 | * | 4/2001 | Seethamraju et al. ........ 428/326 |

(Continued)

FOREIGN PATENT DOCUMENTS

JP     51-046338     *  4/1976

(Continued)

*Primary Examiner* — Vivian Chen
(74) *Attorney, Agent, or Firm* — Lee & Morse, P.C.

(57) ABSTRACT

A composite solid surface article includes a surface layer with at least one first polymeric resin and a filler, and a backing layer on the surface layer with at least one second polymeric resin and wood particles.

16 Claims, 2 Drawing Sheets

U.S. PATENT DOCUMENTS

| | | | |
|---|---|---|---|
| 6,344,268 B1 * | 2/2002 | Stucky et al. | 428/317.9 |
| 6,517,897 B1 * | 2/2003 | Bordener | 427/133 |
| 6,566,424 B2 | 5/2003 | Afiouni | |
| 6,582,636 B1 * | 6/2003 | Swarts | 264/113 |
| 6,638,612 B2 * | 10/2003 | Jones | 428/323 |
| 6,716,522 B2 | 4/2004 | Matsumoto et al. | |
| 6,790,393 B1 * | 9/2004 | Kraker | 264/71 |
| 6,890,965 B1 * | 5/2005 | Johnson et al. | 521/54 |
| 6,972,153 B2 * | 12/2005 | Muller et al. | 428/212 |
| 7,198,833 B1 * | 4/2007 | West | 428/15 |
| 7,566,492 B2 * | 7/2009 | Park et al. | 428/318.8 |
| 7,662,870 B2 * | 2/2010 | Park et al. | 523/171 |
| 2003/0050380 A1 * | 3/2003 | Risley | 524/445 |
| 2004/0121161 A1 | 6/2004 | Shugert et al. | |
| 2006/0121264 A1 * | 6/2006 | Rha et al. | 428/292.1 |

FOREIGN PATENT DOCUMENTS

| | | | |
|---|---|---|---|
| JP | 04-104979 | * | 4/1992 |
| JP | 11-254580 | | 9/1999 |
| JP | 2000-159556 | * | 6/2000 |
| KR | 1998-066197 | | 10/1998 |

* cited by examiner (A)

(B)

COMPOSITE SOLID SURFACE ARTICLE WITH A BACKING AND METHOD OF FORMING THE SAME

CROSS-REFERENCE TO RELATED APPLICATION

This application is a continuation of PCT Application No. PCT/KR2005/004321, entitled "Artificial Marble with Plywood-Looking Layer Laminated and Method for Preparing the Same," which was filed on Dec. 15, 2005, and is hereby incorporated be reference in its entirety.

BACKGROUND OF THE INVENTION

1. Field of the Invention

Embodiments of the present invention relate to a composite solid surface article. More particularly, embodiments of the present invention relate to a composite solid surface article with a backing.

2. Description of the Related Art

In general, composite solid surface materials refer to artificial polymeric compositions, e.g., acrylic or unsaturated polyester, that may be used to imitate natural materials, e.g., stones, due to their appearance, light weight, and good workability. Conventional composite solid surface materials may be formed into solid composite surface layers, and may be applied to wooden base panels, e.g., plywood. Once composite solid surface materials are affixed with the base panels, they may be used to build structures, e.g., kitchen and bathroom countertops, wash bowls, dressing tables, bathtubs, various table surfaces, wall materials, interior articles, and so forth.

However, conventional composite solid surface articles, i.e., a composite solid surface material on a wooden base panel, may be heavy, and may exhibit poor workability. Further, such composite solid surface articles may have poor durability and limited uses due to a bonding agent used therein. Composite solid surface articles may also require high production costs.

SUMMARY OF THE INVENTION

Embodiments of the present invention are therefore directed to a composite solid surface article and method of forming the same, which substantially overcome one or more of the problems due to the limitations and disadvantages of the related art.

It is therefore a feature of an embodiment of the present invention to provide a composite solid surface article with a light-weight backing.

It is therefore another feature of an embodiment of the present invention to provide a method of forming a composite solid surface article with a light-weight backing.

At least one of the above and other features and advantages may be realized by providing a composite solid surface article, including a surface layer with at least one first polymeric resin and a filler, and a backing layer on the surface layer, the backing layer having at least one second polymeric resin and wood particles. The wood particles may include one or more of wood chips, wood flakes, sawdust, and bran.

The first and second polymeric resin may be different resins. The second polymeric resin may include one or more of an acrylic resin and an unsaturated polyester resin.

The backing layer may be thicker than the surface layer. The backing layer may have a foam structure. The backing layer may further include an inorganic filler. The backing layer may include an inorganic filler in an amount of about 5 to about 80 ppwp. The backing layer may include the second polymeric resin in an amount of about 100 parts by weight and the wood particles in an amount of about 5 to about 160 ppwp.

At least one of the above and other features and advantages may be also realized by providing a composite solid surface structure, including a composite solid surface article including a surface layer having at least one first polymeric resin and a filler and a backing layer having at least one second polymeric resin and wood particles, and a supporting panel attached to the composite solid surface article. The composite solid surface article may have a predetermined shape. The composite solid surface structure may be one or more of a wall, a table, a desk, a workstation, and a countertop.

At least one of the above and other features and advantages may be further realized by providing a method of making a composite solid surface article, including forming a surface layer with at least one first polymeric resin and a filler, forming a backing layer with at least one second polymeric resin and wood particles on the surface layer, and curing the surface and backing layers.

Forming the backing layer with the wood particles may include employing one or more of wood chips, wood flakes, sawdust, and bran. The wood particles may be formed by one or more of wood cutting, wood milling, and wood sawing. Forming the backing layer with the second polymeric resin may include employing one or more of an acrylic resin and an unsaturated polyester resin. Forming the backing layer may further include using an inorganic filler. Forming the backing layer may include using about 100 parts by weight of at least one second polymeric resin and about 5 to about 160 ppwp of wood particles. The backing layer may further include an inorganic filler in an amount of about 5 to about 80 ppwp. The backing layer has a fluidity from about 13 cm/min to about 20 cm/min.

Providing the surface layer may include mixing a polymeric resin and a filler to form a curable composition. Providing the surface layer may further include partially curing the curable composition for a first time period. Curing the surface layer and the backing layer may include curing the partially cured surface layer and the backing layer simultaneously for the second time period, the first and second time periods being separated by an interval.

BRIEF DESCRIPTION OF THE DRAWINGS

The above and other features and advantages of the present invention will become more apparent to those of ordinary skill in the art by describing in detail exemplary embodiments thereof with reference to the attached drawings, in which.

DETAILED DESCRIPTION OF THE INVENTION

Korean Patent Application No. 10-2004-0107879 filed on Dec. 17, 2004, in the Korean Intellectual Property Office, and entitled: "Artificial Marble with Plywood-Looking Layer Laminated and Method for Preparing the Same," is incorporated by reference herein in its entirety.

Figure 1:
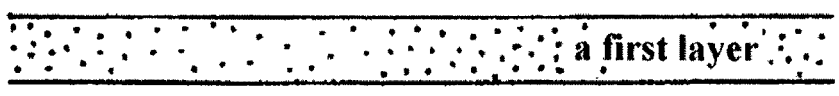
FIG. 1 illustrates a schematic cross-section of a composite solid surface article according to an embodiment of the present invention.
Figure 1:

An exemplary embodiment of a composite solid surface article according to the present invention may include a first layer functioning as a surface layer on a second layer functioning as a backing layer, as illustrated in FIG. 1. The first and second layers may be laminated to each other to form a single composite article.

The first layer of the composite solid surface article may be formed of a curable composition. The curable composition may include at least one polymeric resin, e.g., an acrylic resin or an unsaturated polyester resin, and a filler at predetermined proportions as determined by one of ordinary skill in the art. The curable composition may further include chips, e.g., marble chips, to impart a stone-like appearance to the composition and an initiator.

The second layer of the composite solid surface article may be formed of a polymerizable composition. The polymerizable composition may include a polymeric resin, a mixture of wood particles with a filler, and an initiator. In particular, the polymerizable composition may include about 100 parts by weight of a polymeric resin, about 10 to 240 parts by weight of a mixture of wood particles with a filler, and about 0.1 to 10 parts by weight of an initiator. The mixture of wood particles with a filler may include about 5 to 160 parts by weight of wood particles and about 5 to 80 parts by weight of a filler. In this respect, it should be noted that all weights are indicated with respect to the weight of the polymeric resin, i.e., all weights are calculated as "parts by weight per 100 parts by weight of the polymeric resin" or "ppwp."

The polymeric resin of the polymerizable composition may be an unsaturated polyester or an acrylic resin. If an acrylic resin is used, it may include a mixture of an acrylic monomer with a corresponding polyacrylate, e.g., a mixture of methyl methacrylate with polymethylmethacrylate (PMMA). Examples of suitable acrylic monomers may include methyl acrylate, ethyl acrylate, butyl acrylate, methyl methacrylate, ethyl methacrylate, isopropyl methacrylate, butyl methacrylate, 2-ethylhexyl methacrylate, and so forth. The acrylic monomer may be present in the acrylic resin in an amount of at least about 65% by weight. The polyacrylate may be present in the acrylic resin in an amount of about 35% or less by weight.

The wood particles of the polymerizable composition may be of any type as determined by one of ordinary skill in the art to impart a wood or a wood-grain appearance to the second layer. For example, the wood particles may be fine particles of processed wood by-products, e.g., sawdust, wood flakes, bran, and the like. The wood particles may be either pretreated or not. An amount of wood particles in the polymerizable composition may be about 5 to about 160 ppwp. Grain may be used in addition to or instead of the wood particles.

The filler of the polymerizable composition may be any inorganic filler as determined by one of ordinary skill in the art. For example, the inorganic filler may include calcium carbonate, aluminum hydroxide, silica, alumina, magnesium hydroxide, and so forth. Use of aluminum hydroxide may impart an elegant appearance to the composite solid surface article. An amount of the inorganic filler in the polymerizable composition may be about 5 to about 80 ppwp. A total amount of a mixture of wood particles with the inorganic filler in the polymerizable composition may be about 10 to 240 ppwp.

The initiator of the polymerizable composition may include peroxides, e.g., benzoyl peroxide, lauroyl peroxide, butyl hydroperoxide, cumene hydroperoxide, and so forth, and azo compounds, e.g., azobisisobutylonitrile. An amount of the initiator in the polymerizable composition may be in a range of from about 0.1 to about 10 ppwp. It should be noted that in order to provide sufficient foaming, the amount of the initiator in the polymerizable composition of the second layer may be larger than an amount of the initiator in the curable composition of the first layer.

The polymerizable composition of the second layer may have a fluidity of about 13 cm/min to about 20 cm/min. "Fluidity," as used herein, refers to a value obtained by dropping 30 g of a fluid onto a horizontal glass plate, allowing the fluid to spread on the glass plate for 1 minute, and measuring the diameter of the fluid, i.e., measuring a distance between two edges of the spread fluid through its center with respect to time as "cm/min." Although the "fluidity" is not used in this description as a reciprocal of "viscosity" as conventionally used in the art, a high fluidity of a fluid may indicate a low viscosity thereof.

The composite solid surface article according to an embodiment of the present invention may be prepared as follows. The curable composition may be mixed and partially cured for a first predetermined period to form the first layer. Then, the polymerizable composition may be mixed and poured onto the first layer to form the second layer. The second layer may be formed to be about 0.1 to about 50 times thicker than the first layer. Preferably, the second layer may be thicker than the first layer, as illustrated in FIG. 1.

The polymerizable composition may be foamed by an exothermic polymerization reaction of the acrylic monomer. More specifically, the polymerizable composition may be poured onto the first layer to form a laminated two-layer structure. The exothermic polymerization of the acrylic monomer of the polymerizable composition may cause seething thereof, thereby generating gas and foaming of the second layer.

Next, the first and second layers may be slow cured simultaneously for a second predetermined period to form the composite solid surface article. Curing of the second layer may impart a rigid foam structure thereto. The first and second cured layers may provide a single composite solid surface article with a two-layer laminated structure, so that one surface may function as a surface layer, i.e., the first layer, with a stone-like appearance, and the other side may function as a plywood-looking backing layer, i.e., the second layer.

Example

A mixture of 25% by weight of polymethylmethacrylate and 75% by weight of methyl methacrylate was prepared to form 100 parts of a first acrylic resin. The 100 parts of the first acrylic resin were mixed with 135 ppwp of aluminum hydroxide, 20 ppwp of solid chips, and 2 ppwp of lauroyl peroxide to form a curable composition.

A mixture of 30% by weight of polymethylmethacrylate and 70% by weight of methyl methacrylate was prepared to form 100 parts of a second acrylic resin. The 100 parts of the second acrylic resin were mixed with 10 ppwp of an aluminum hydroxide, 155 ppwp of sawdust, and 2 ppwp of benzoyl peroxide to form a polymerizable composition. The fluidity of the polymerizable composition was measured as 15.2 cm/min.

Figure 2:
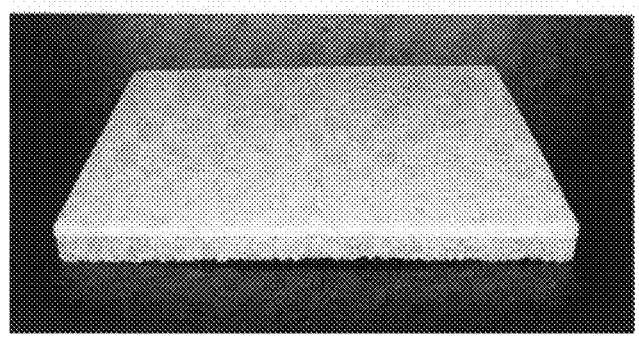
FIGS. 2A-2B illustrate photographs of first and second surfaces, respectively, of a composite solid surface article according to an embodiment of the present invention.
Figure 2:
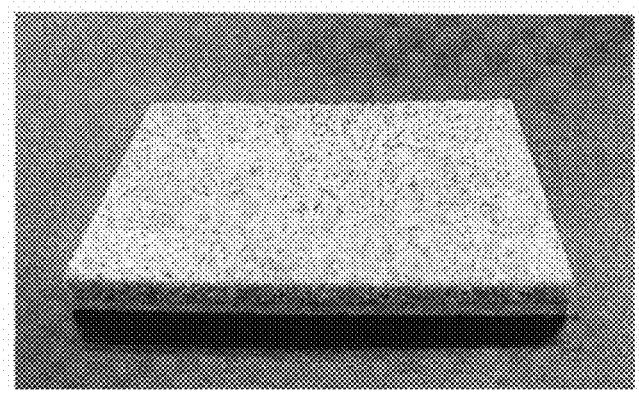

The curable composition was partially cured to form a surface layer, i.e., a first layer. Then, the polymerizable composition was poured onto the first layer, followed by slow curing, to form a composite solid surface article with a two layer structure. The resultant composite solid surface article had one surface with a plywood-looking appearance, as illustrated in FIG. 2A, and one surface with a marble-looking appearance, as illustrated in FIG. 2B.

The composite solid surface article according to embodiments of the present invention may have a reduced weight and an enhanced workability as compared to a conventional composite solid surface article having a same size. Accordingly, the composite solid surface article may be cut into a predetermined shape and size, so that it may be affixed to a supporting panel to form a composite solid surface structure. The composite solid surface structure may be, e.g., a wall, a table, a desk, a workstation, a countertop, a tub, and so forth, so that a kitchen, a bathroom, a building, and so forth may be built. The composite solid surface article may be affixed to the supporting panel by any means as determined by one of ordinary skill in the art, e.g., adhesive.

Exemplary embodiments of the present invention have been disclosed herein, and although specific terms are employed, they are used and are to be interpreted ip a generic and descriptive sense only and not for purpose of limitation. For example, it will be understood that when a layer is referred to as being "on" another layer or substrate, it can be directly on the other layer or substrate, or intervening layers may also be present. Accordingly, it will be understood by those of ordinary skill in the art that various changes in form and details may be made without departing from the spirit and scope of the present invention as set forth in the following claims.

What is claimed is:

1. A composite solid surface article, comprising:
    a surface layer including an acrylic resin or an unsaturated polyester resin, and including a first filler; and
    a backing layer including about 100 parts by weight of a mixture of an acrylic monomer and a polyacrylate, and including about 10 to about 240 parts by weight of a mixture of wood particles and a second filler,
    wherein the backing layer is laminated onto the surface layer to form a single body, and the backing layer has a foam structure.

2. The composite solid surface article as claimed in claim 1, wherein the wood particles include one or more of wood chips, wood flakes, sawdust, and bran.

3. The composite solid surface article as claimed in claim 1, wherein the surface layer further comprises marble chips.

4. The composite solid surface article as claimed in claim 1, wherein the acrylic monomer is one of a methyl acrylate, an ethyl acrylate, a butyl acrylate, a methyl methacrylate, an ethyl methacrylate, an isopropyl methacrylate, a butyl methacrylate, and a 2-ethylhexyl methacrylate.

5. The composite solid surface article as claimed in claim 1, wherein the second filler of the backing layer includes one or more of a calcium carbonate, an aluminum hydroxide, a silica, an alumina, and a magnesium hydroxide.

6. The composite solid surface article as claimed in claim 1, wherein the mixture of the wood particles and the second filler in the backing layer includes about 5 to 160 parts by weight of wood particles and about 5 to about 80 parts by weight of the filler.

7. A composite solid surface structure, comprising:
    a composite solid surface article as claimed in claim 1; and
    a supporting panel attached to the composite solid surface article.

8. The structure as claimed in claim 7, wherein the structure is one or more of a wall, a table, a desk, a workstation, and a countertop.

9. A method of making a composite solid surface article, the method comprising:
    partially curing a curable composition including an acrylic resin or an unsaturated polyester resin, and including a first filler, to form a surface layer;
    pouring a polymerizable composition including about 100 parts by weight of a mixture of an acrylic monomer and a polyacrylate, and including about 10 to 240 parts by weight of a mixture of wood particles and a second filler, onto the surface layer to form a backing layer;
    foaming the polymerizable composition by an exothermic polymerization reaction of the acrylic monomer; and
    curing the surface layer and the backing layer to form a composite solid surface article.

10. The method as claimed in claim 9, wherein the wood particles include one or more of wood chips, wood flakes, sawdust, and bran.

11. The method as claimed in claim 9, wherein the wood particles are formed by one or more of wood cutting, wood milling, and wood sawing.

12. The method as claimed in claim 9, wherein the curable composition further includes marble chips.

13. The method as claimed in claim 9, wherein the acrylic monomer is one of a methyl acrylate, an ethyl acrylate, a butyl acrylate, a methyl methacrylate, an ethyl methacrylate, an isopropyl methacrylate, a butyl methacrylate, and a 2-ethylhexyl methacrylate.

14. The method as claimed in claim 9, wherein the second filler of the backing layer is one or more selected from the group consisting of calcium carbonate, aluminum hydroxide, silica, alumina, and magnesium hydroxide.

15. The method as claimed in claim 9, wherein the mixture of wood particles and the second filler in the backing layer includes about 5 to about 160 parts by weight of wood particles and about 5 to about 80 parts by weight of the second filler.

16. The method as claimed in claim 9, wherein the polymerizable composition has a fluidity from about 13 cm/min to about 20 cm/min before foaming.

* * * * *